United States Patent
Strickland, Jr.

(10) Patent No.: US 8,316,909 B2
(45) Date of Patent: Nov. 27, 2012

(54) AUTOMATIC BEAD SEATER ASSEMBLY

(76) Inventor: David Strickland, Jr., Birmingham, AL (US)

( * ) Notice: Subject to any disclaimer, the term of this patent is extended or adjusted under 35 U.S.C. 154(b) by 0 days.

(21) Appl. No.: 13/209,838

(22) Filed: Aug. 15, 2011

(65) Prior Publication Data

US 2011/0297330 A1   Dec. 8, 2011

Related U.S. Application Data

(63) Continuation of application No. 11/747,146, filed on May 10, 2007, now Pat. No. 7,997,321.

(60) Provisional application No. 60/746,923, filed on May 10, 2006.

(51) Int. Cl.
*B27H 7/00* (2006.01)

(52) U.S. Cl. .............. 157/1; 157/1.1; 157/1.24; 157/15

(58) Field of Classification Search .............. 157/1, 1.7, 157/24, 7, 15

See application file for complete search history.

(56) References Cited

U.S. PATENT DOCUMENTS

| | | | | |
|---|---|---|---|---|
| 3,736,975 A | * | 6/1973 | Strang et al. | 157/1.1 |
| 6,761,061 B2 | * | 7/2004 | Corghi | 73/146 |
| 2003/0178151 A1 | * | 9/2003 | Ritchie et al. | 157/1.17 |

* cited by examiner

*Primary Examiner* — Joseph J Hail
*Assistant Examiner* — Shantese McDonald
(74) *Attorney, Agent, or Firm* — Wayne Edward Ramage; Baker Donelson

(57) ABSTRACT

An automatic bead seating assembly to automatically move a bead seating assembly or manifold into contact with a wheel or tire assembly and cause the bead to be seated. The assembly comprises an extendable and retractable seater arm attached at one end to a base, with a bead seater or manifold assembly attached or mounted at the other end. The bead seater or manifold assembly may comprises a reservoir filled with compressed air or other gas, and a hose or pipe for movement of the air or gas from the reservoir to a nozzle of an appropriate size and shape to fit a particular wheel or tire. The seater arm extends forward until the bead seater or manifold assembly comes into contact with the wheel or tire assembly, whereupon air or gas from the manifold reservoir is released, causing the tire bead to be seated. The seater arm then retracts.

6 Claims, 1 Drawing Sheet

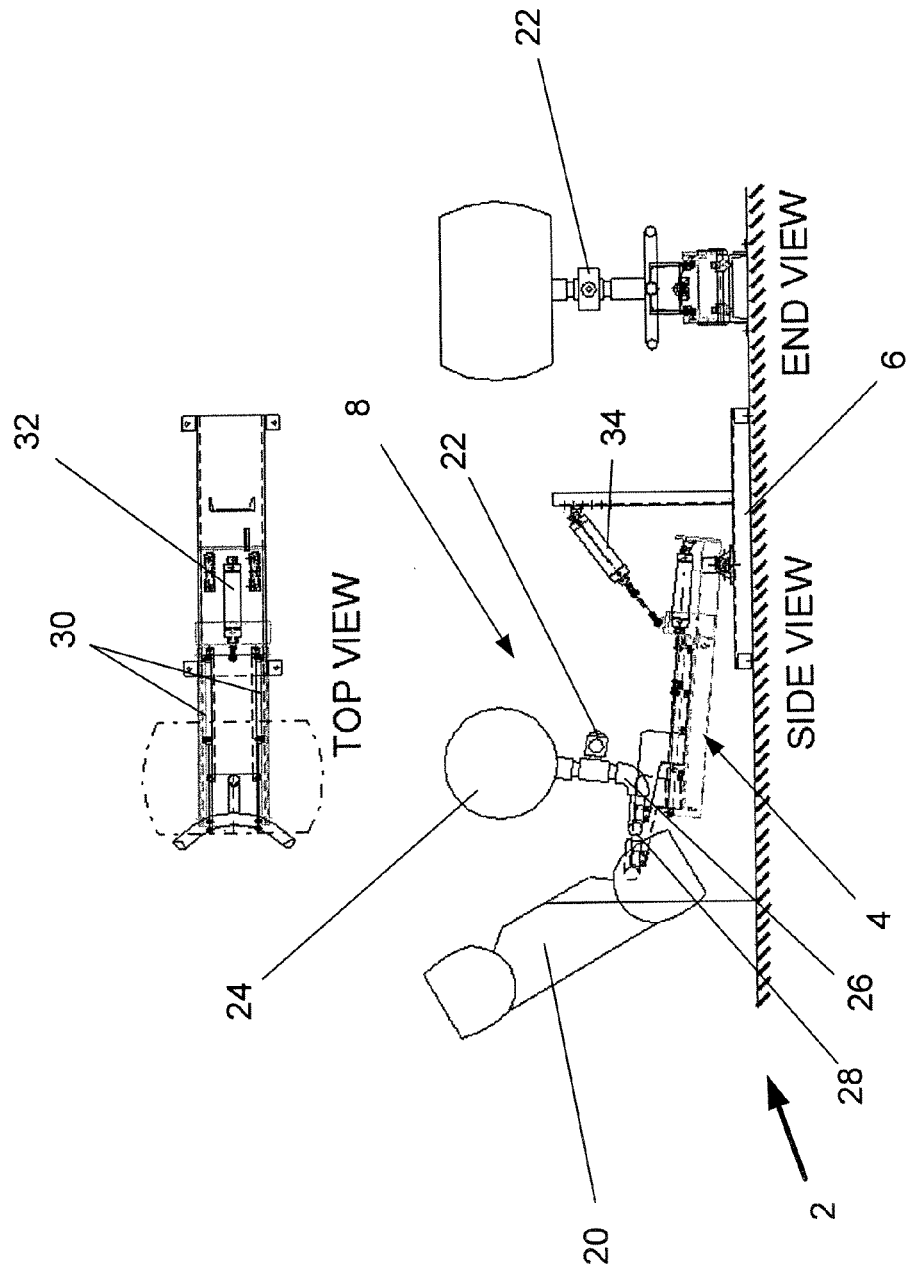

AUTOMATIC BEAD SEATER ASSEMBLY

This application is a continuation application of U.S. patent application Ser. No. 11/747,146, filed May 10, 2007 now U.S. Pat. No. 7,997,321, which claims benefit of and priority to U.S. Provisional Patent Application No. 60/746,923, filed May 10, 2006, entitled "AUTOMATIC BEAD SEATER ASSEMBLY," and is entitled to the benefit of those filing dates in whole or in part. The specifications, drawings, and complete disclosure of U.S. Provisional Patent Application No. 60/746,923 and U.S. patent application Ser. No. 11/747,146 are incorporated herein by specific reference for all purposes.

FIELD OF INVENTION

This invention relates to devices for seating a tire bead on a wheel, and related methods.

BACKGROUND OF INVENTION

Various techniques and devices are known in the art for seating the bead, or inner rim, or a tire on a wheel rim. The goal is to ensure that the bead of the tire aligns with and seats within the bead seat on the wheel rim. Air may be trapped between the edges of a tire and the rim during the mounting process. When vehicle wheel is balanced with the trapped air in place, undesired imbalance conditions can result during operations after the trapped air escapes.

The bead seating problem is not easily solved. Friction inhibits movement between the rubber tire and the metal rim. Some bead seating methods use lubrication combined with partial inflation and manipulation of the tire. These methods are labor intensive and relatively slow. Some machines address the problem by massaging or pushing on the tire in order to seat the bead. But these techniques also are relatively slow and lead to imperfect bead seating. They also require extensive human involvement.

Accordingly, what is needed is an improved bead seater assembly that can automatically perform the bead seating task in an automatic tire installation and wheel assembly operation.

SUMMARY OF THE INVENTION

In one exemplary embodiment, the present invention comprises an automatic bead seater assembly with an extendable and retractable seater arm attached at one end to a base, with a bead seater or manifold assembly attached or mounted at the other end. The bead seater or manifold assembly may comprises a reservoir filled with compressed air or other gas, and a hose or pipe for movement of the air or gas from the reservoir to a nozzle of an appropriate size and shape to fit a particular wheel or tire. The hose or pipe and reservoir are connected by a valve.

The invention may be used in a wire or tire assembly operation. A tire or wheel assembly is moved into inflation position, which activates the bead seating process. The tire or wheel assembly is locked into place, or movement is otherwise inhibited, and then the seater arm extends forward, moving the manifold assembly towards the tire or wheel assembly. When the manifold assembly contacts the tire assembly, which may be determined by sensors, the valve in the manifold assembly is activated, releasing air or other gas from the manifold reservoir to cause the tire bead to be seated. The seater arm then retracts, moving the manifold assembly back from the tire assembly. The tire assembly is released to move, and is moved to the next stage of processing (typically, inflation). The next tire or wheel assembly is then moved into place, and the process repeats.

In one exemplary embodiment, the seater arm may comprise two or more sub-pieces. The seater arm may comprise two parallel bars supporting the manifold assembly, with a piston-like section connecting the parallel bars to the base. The piston(s) may be pneumatic, and allows for the extension and retraction of the manifold assembly. A second piston assembly or support device may be used to hold the seater arm in the appropriate position, and this second piston assembly also may extend and retract with the seater arm. The second piston assembly may be attached to appropriate support means, such as a vertical bar, rod or post extending up from the base.

DESCRIPTION OF THE DRAWINGS

FIG. 1 shows views of a bead seating assembly in accordance with one embodiment of the present invention.

DETAILED DESCRIPTION OF EXEMPLARY EMBODIMENTS

As shown in FIG. 1, one exemplary embodiment of the present invention comprises an automatic bead seater assembly 2 comprising a seater arm 4 attached at one end to a base 6, with a bead seater or manifold assembly 8 attached or mounted at the other end. The bead seater or manifold assembly 8 comprises a reservoir 24 filled with compressed air or other gas, and a hose or pipe 26 for movement of the air or gas from the reservoir 24 to a nozzle 28 of an appropriate size and shape to fit a particular wheel or tire. The hose or pipe 26 and reservoir 24 are connected by a valve 22. Various types of bead seaters 8 are well known in the industry, and can be used in place of the bead seater or manifold assembly shown in FIG. 1.

Use of the automatic bead seater assembly is as follows: A tire or wheel assembly 20 is moved into inflation position, which activates the bead seating process. The tire or wheel assembly 20 is locked into place, or movement is otherwise inhibited. Then the seater arm 4 gradually extends forward to move the manifold assembly 8 towards the tire or wheel assembly 20. When the manifold assembly 8 is in place, as determined by the appropriate sensors, and the manifold assembly contacts the tire assembly, the valve 22 in the manifold assembly 8 is activated, releasing air or other gas from the manifold reservoir 24 to cause the bead to be seated. The seater arm 4 then retracts, moving the manifold assembly 8 back from the tire assembly 20. The tire assembly 20 is released to move, and is moved to the next stage of processing (typically, inflation). The next tire or wheel assembly 20 is then moved into place, and the process repeats.

In one exemplary embodiment, the seater arm 4 may comprise two or more sub-pieces. As shown in FIG. 1, the seater arm 4 comprises two parallel bars 30 supporting the manifold assembly 8, with a piston-like section 32 connecting the parallel bars to the base 6. The piston may be pneumatic, and allows for the extension and retraction of the manifold assembly 8. A second piston assembly 34 may be used to hold the seater arm 4 up in the appropriate position, and this second piston assembly 34 also extends and retracts. The second piston assembly may be attached to appropriate support means—as shown in FIG. 1, this is a vertical bar 36 extending up from the base 4. In an alternative embodiment, only one piston may be used.

In another exemplary embodiment, the device may include controls and sensors to control the action, which may be limited to a single axis.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

What is claimed is:

1. A device for automatically seating a bead on a tire, comprising:
    a bead seating assembly affixed to a first end of an extendible arm, the bead seating assembly comprising a reservoir filled with a compressed gas, and a bead seating nozzle in fluid connection with the reservoir; and
    a support assembly connected to the arm, wherein the support assembly comprises a piston with a first and second end, the first end of the piston attached to the arm at a point between the first and second ends of said arm.

2. The device of claim 1, further comprising a base, wherein a second end of the extendible arm is connected to the base.

3. The device of claim 1, further comprising one or more piston assemblies attached to the arm.

4. The device of claim 3, wherein the piston assemblies cause the arm to extend and retract.

5. The device of claim 1, wherein the arm comprises two parallel bars.

6. The device of claim 1, further comprising sensors in the bead seating assembly.

\* \* \* \* \*